July 26, 1949.  E. C. WEISKOPF  2,477,396
PROJECTING MICROSCOPE AND VIEWING DEVICE
Filed Aug. 27, 1946  10 Sheets-Sheet 1

INVENTOR
EDWIN C. WEISKOPF
BY Harry Cole
ATTORNEY

July 26, 1949.　　　　E. C. WEISKOPF　　　　2,477,396
PROJECTING MICROSCOPE AND VIEWING DEVICE
Filed Aug. 27, 1946　　　　　　　　　　　　　10 Sheets-Sheet 2

INVENTOR
EDWIN C. WEISKOPF
BY
ATTORNEY

July 26, 1949. E. C. WEISKOPF 2,477,396
PROJECTING MICROSCOPE AND VIEWING DEVICE
Filed Aug. 27, 1946 10 Sheets-Sheet 3
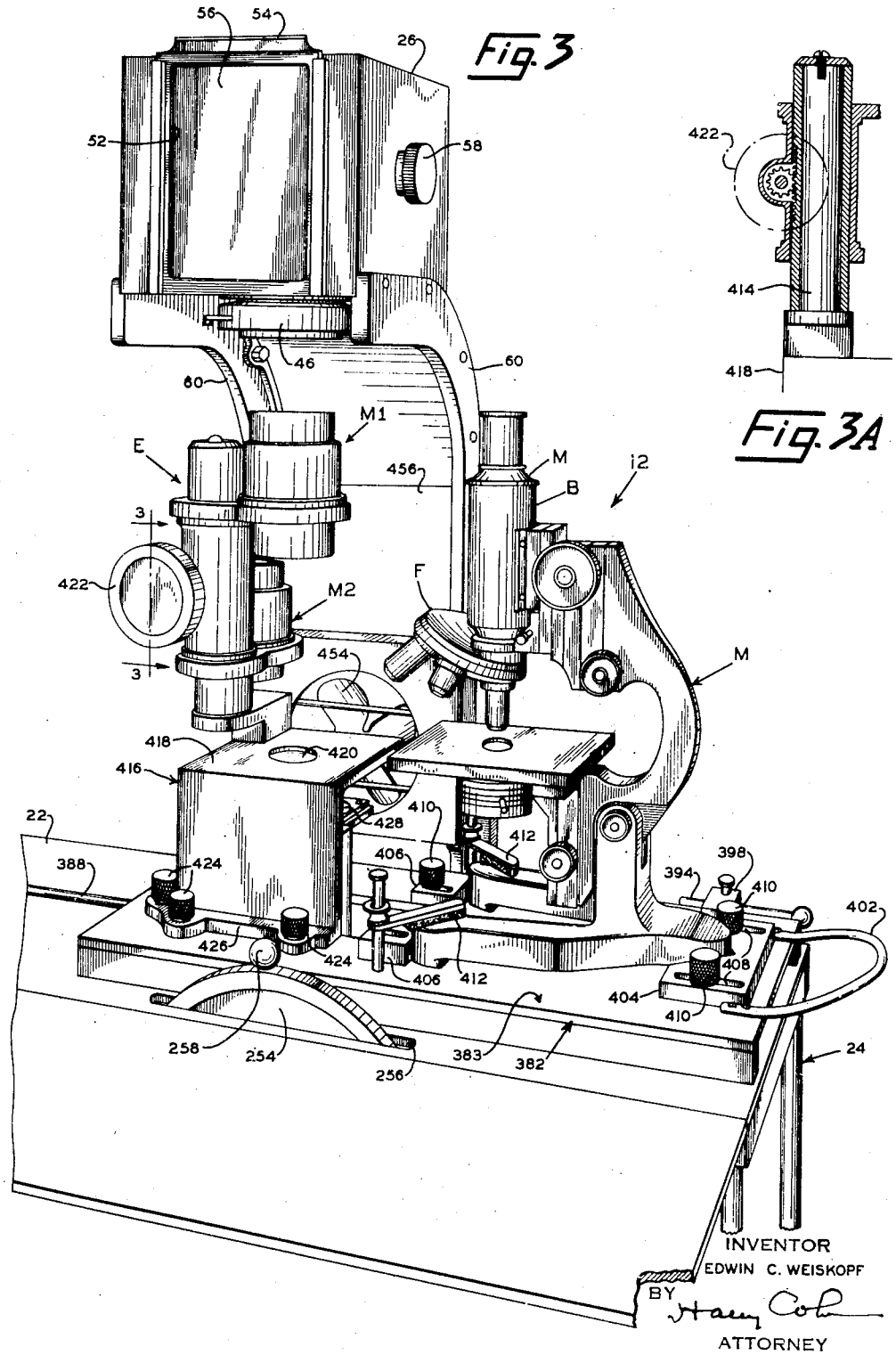
INVENTOR
EDWIN C. WEISKOPF
BY
Harry Cohn
ATTORNEY July 26, 1949.                E. C. WEISKOPF                2,477,396
                    PROJECTING MICROSCOPE AND VIEWING DEVICE
Filed Aug. 27, 1946                                      10 Sheets-Sheet 4

INVENTOR
EDWIN C. WEISKOPF
BY
ATTORNEY

July 26, 1949.                    E. C. WEISKOPF                    2,477,396
                    PROJECTING MICROSCOPE AND VIEWING DEVICE
Filed Aug. 27, 1946                                         10 Sheets-Sheet 5
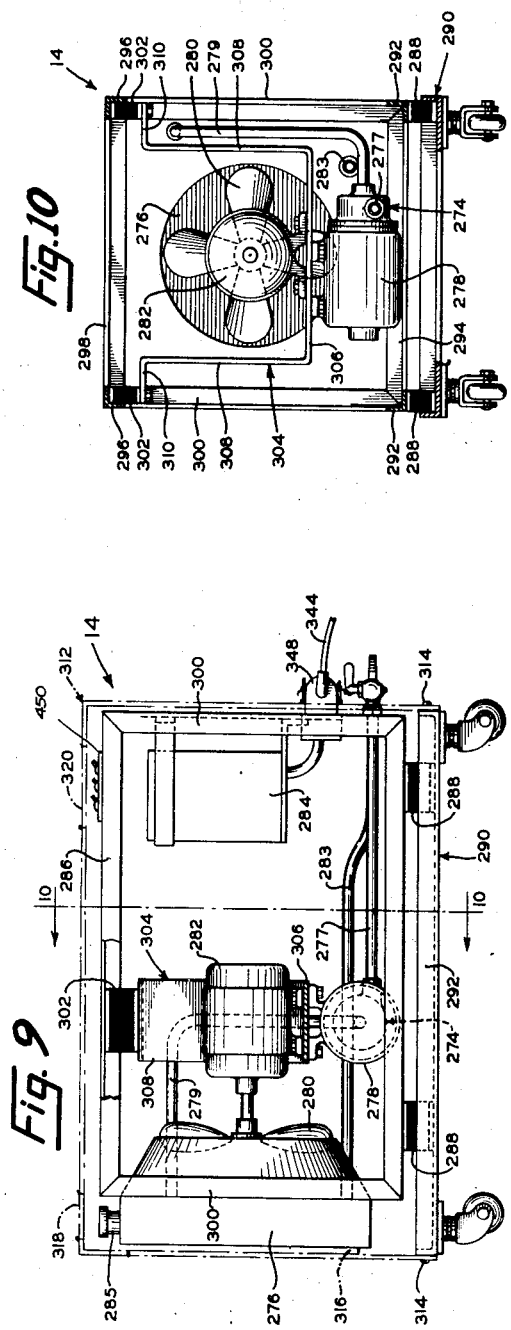
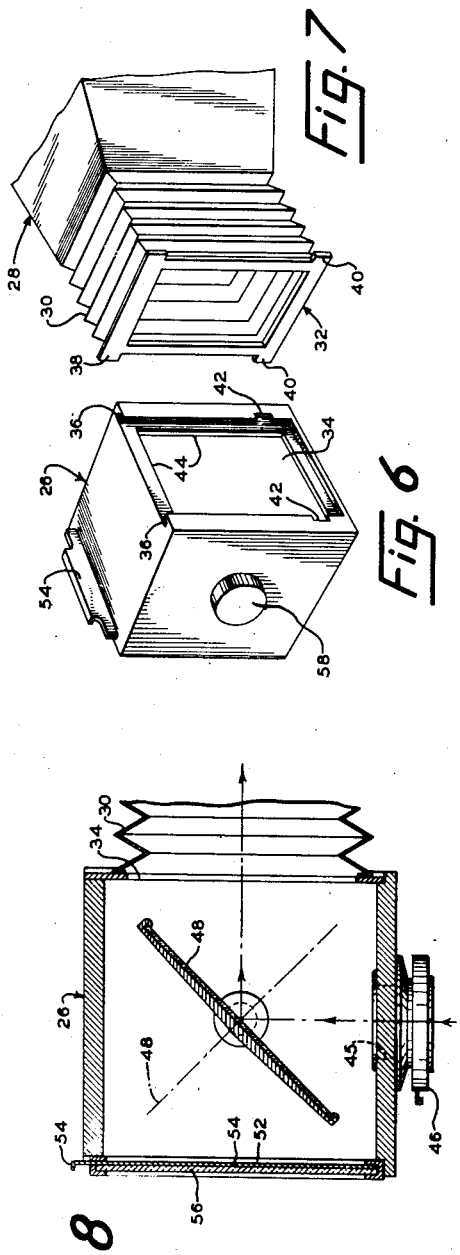
INVENTOR
EDWIN C. WEISKOPF
BY
ATTORNEY July 26, 1949.  E. C. WEISKOPF  2,477,396
PROJECTING MICROSCOPE AND VIEWING DEVICE
Filed Aug. 27, 1946  10 Sheets-Sheet 6
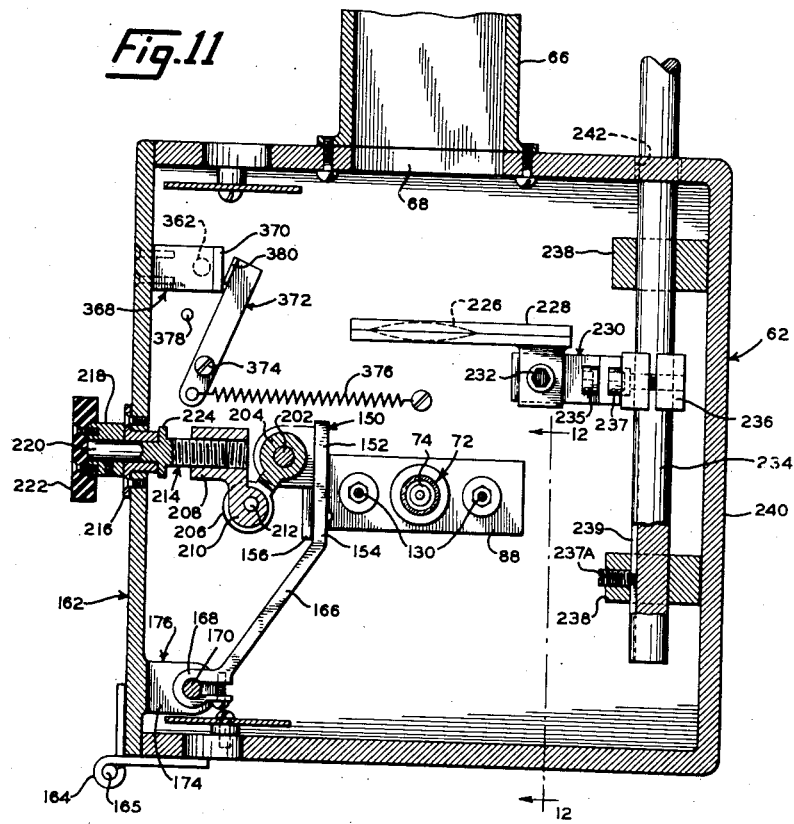
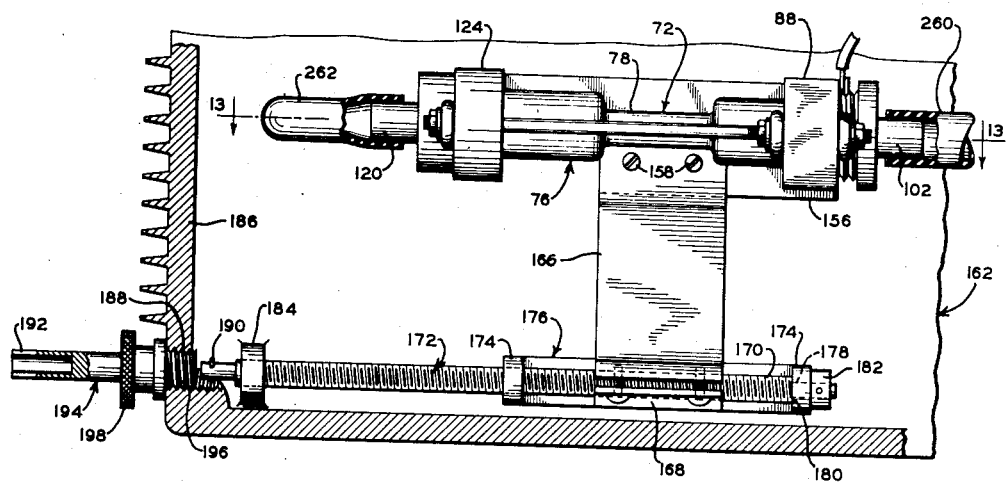
INVENTOR
EDWIN C. WEISKOPF
BY Harry Cole
ATTORNEY July 26, 1949.  E. C. WEISKOPF  2,477,396
PROJECTING MICROSCOPE AND VIEWING DEVICE
Filed Aug. 27, 1946  10 Sheets-Sheet 7

INVENTOR
EDWIN C. WEISKOPF
BY
ATTORNEY

July 26, 1949.  E. C. WEISKOPF  2,477,396
PROJECTING MICROSCOPE AND VIEWING DEVICE
Filed Aug. 27, 1946  10 Sheets-Sheet 8

INVENTOR
EDWIN C. WEISKOPF
BY
ATTORNEY

July 26, 1949.  E. C. WEISKOPF  2,477,396
PROJECTING MICROSCOPE AND VIEWING DEVICE
Filed Aug. 27, 1946  10 Sheets-Sheet 9
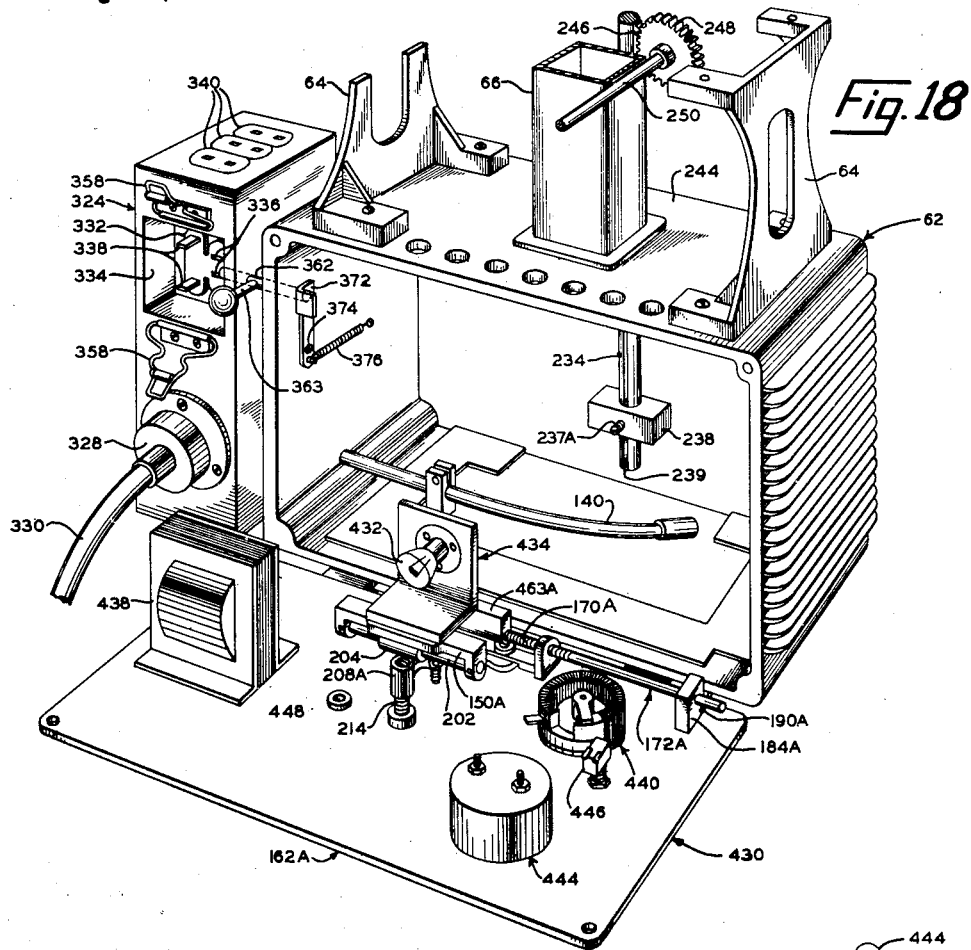
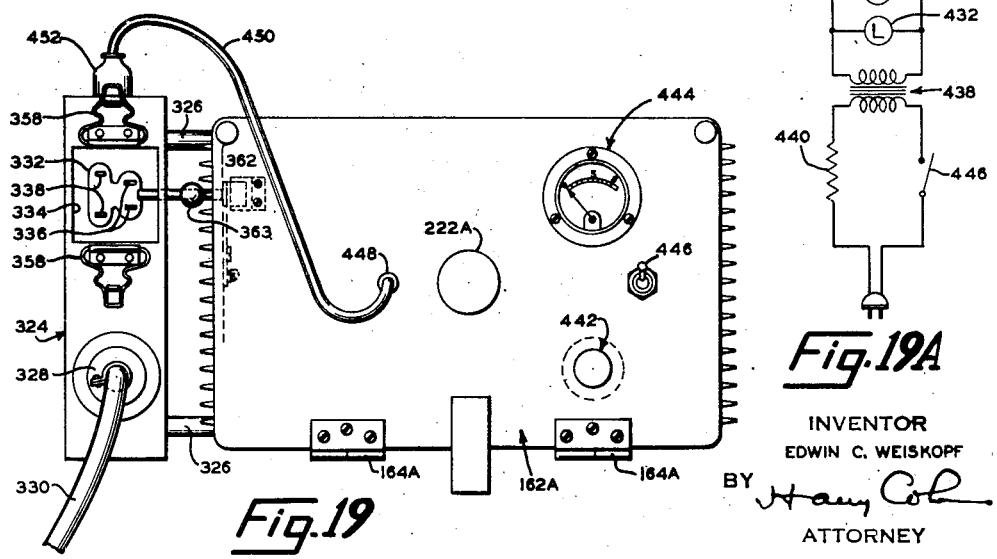
INVENTOR
EDWIN C. WEISKOPF
BY Harry Cole
ATTORNEY July 26, 1949.  E. C. WEISKOPF  2,477,396
PROJECTING MICROSCOPE AND VIEWING DEVICE
Filed Aug. 27, 1946  10 Sheets-Sheet 10
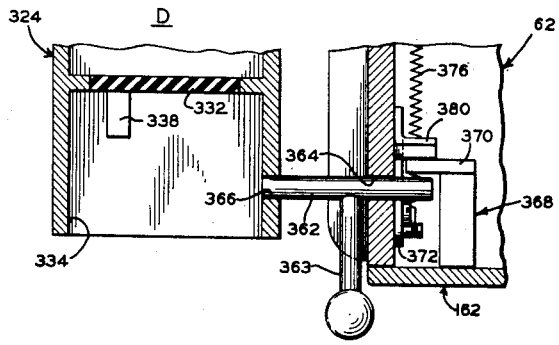
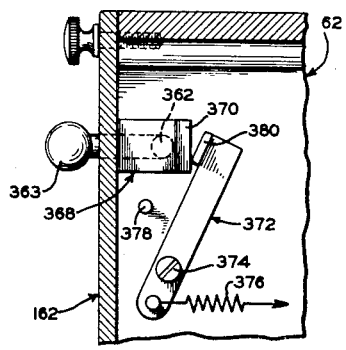
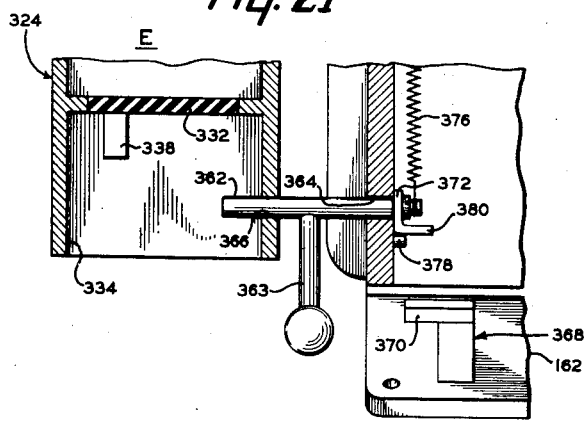
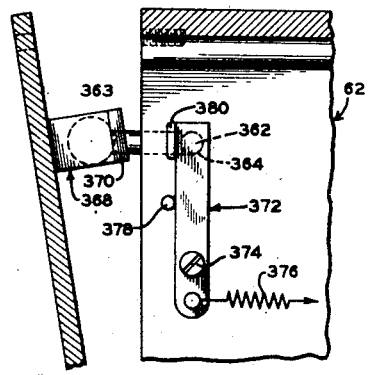
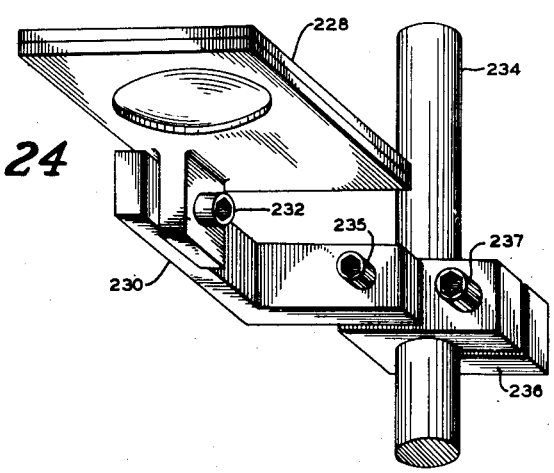
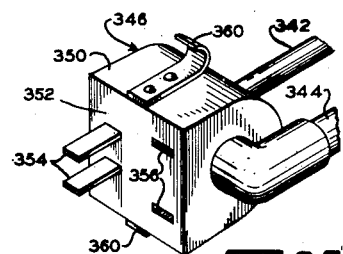
INVENTOR
EDWIN C. WEISKOPF
BY
ATTORNEY Patented July 26, 1949

2,477,396

UNITED STATES PATENT OFFICE 2,477,396

PROJECTING MICROSCOPE AND VIEWING DEVICE

Edwin C. Weiskopf, New York, N. Y.

Application August 27, 1946, Serial No. 693,292

13 Claims. (Cl. 88—24)

This invention relates to projectors for microscopes and other magnifying devices, and this application is a continuation in part of my application Serial No. 515,736 filed December 27, 1943 and my application Serial No. 597,286 filed June 2, 1945, which have matured into Patent Nos. 2,435,299 and 2,435,300, respectively, each dated February 3, 1948.

The apparatus to which the present invention relates is especially useful by pathologists, other members of the medical profession, bacteriologists, pathologists' technicians, and others, in the microscopic examination of tissue or other specimens. The apparatus embodying my invention enables microscope slides to be projected through a conventional microscope in such manner that the image of the slide magnified by the microscope can be viewed simultaneously by a group of individuals in any suitable projection room, with excellent reproduction of the slide on the screen, or the image of the slide magnified by the microscope can be projected into a viewing chamber as shown, for example, in my Patent No. 2,378,672 granted June 19, 1945.

The apparatus of the present invention as disclosed in this application is well adapted for accomplishing all of the objects set forth in my above mentioned applications, of which the present application is a continuation in part, and in addition the apparatus of this application enables various other desirable results to be accomplished.

One of the objects of the invention embodied in the apparatus of the instant application is to provide a projector unit and a viewing chamber unit which, while completely separable from each other in their unitary forms, respectively, can be easily and conveniently connected to each other operatively so that the projector unit can be used either alone in a projection room or in association with the vewing chamber unit when it is desired to use the latter.

A further object of the invention is the provision of an improved light projector for use in projecting the images of micro-slides.

A further object of the present invention is to provide an improved power unit which is used in conjunction with the projector unit.

Another object is to provide interchangeable light mounting units, for alternative use with the lamp housing and associated parts of the light projector unit.

A further object is the provision, in conjunction with the projector and power units, of improved electrical distribution means for improving the safety factor of the apparatus in respect to reducing or substantially eliminating the danger of personal injury attending the use of high voltage apparatus.

The above and other objects, features and advantages of the present invention will be fully understood from the following description considered in connection with the accompanying illustrative drawings.

In the drawings:

Fig. 3 is a front perspective view, on a larger scale, of part of the projector unit;

Fig. 3A is a section, line 3—3 of Fig. 3;

Fig. 4 is a top plan view of the top of the stand of the projector unit and of the movable support or carrier for the microscope and other magnifying devices, parts being omitted for the purpose of illustration, and parts being shown in section;

Fig. 5 is an end view of the upper part of the stand and of the movable carrier, the latter being shown partly in section;

Fig. 6 is a perspective view of the reflector chamber of the projector unit;

Fig. 7 is a perspective view of a part of the viewing chamber unit;

Fig. 8 is a vertical sectional view of the reflector chamber of the projector unit;

Fig. 9 is a side view of the power unit, partly in section, the housing being removed but indicated by dot and dash lines;

Fig. 10 is a sectional view on the line 10—10 of Fig. 9;

Fig. 11 is a sectional view on the line 11—11 of Fig. 2;

Fig. 12 is a view on the line 12—12 of Fig. 11;

Figure 2:
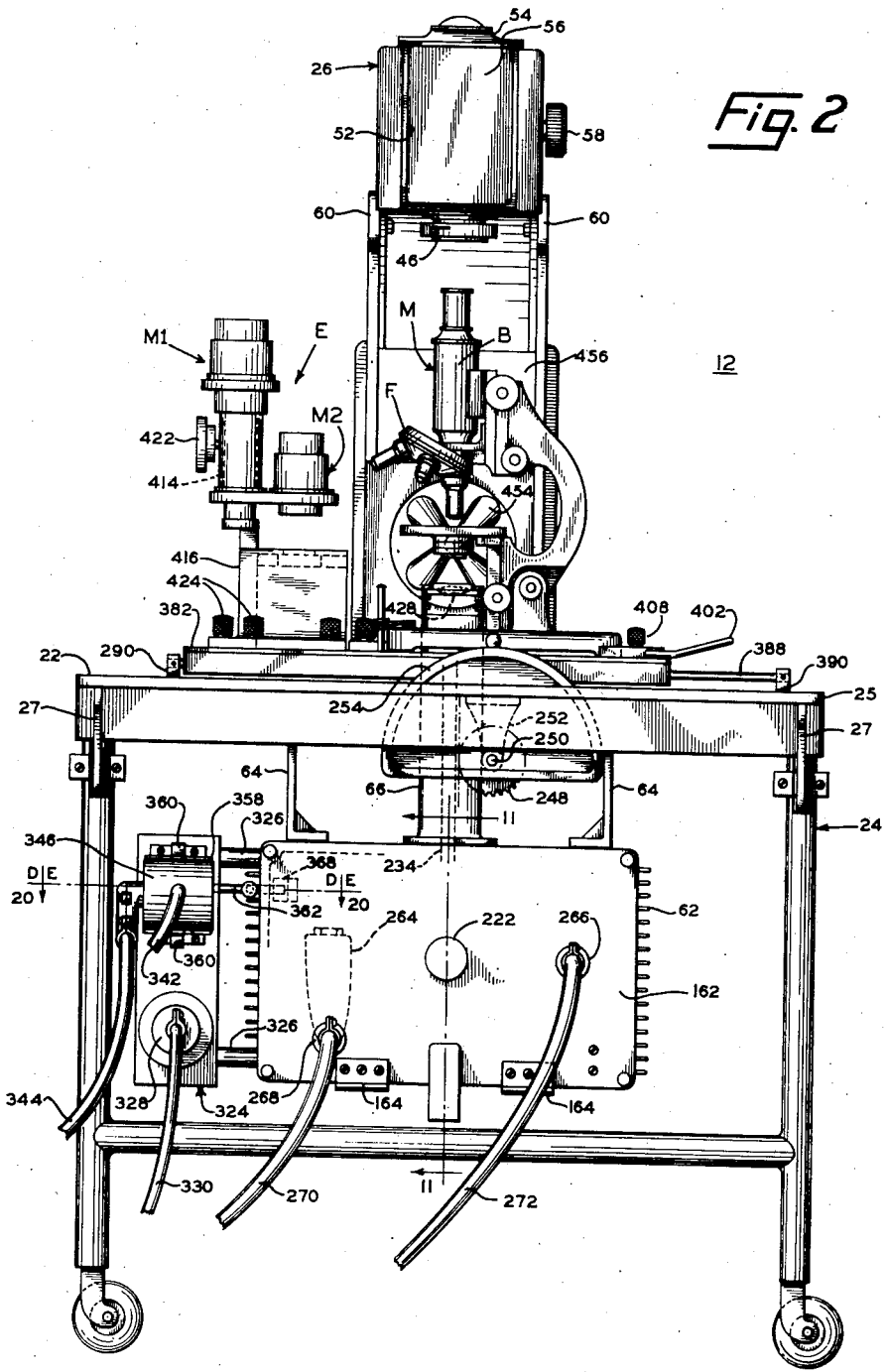
Fig. 2 is a front view of the projector unit.
Figure 13:
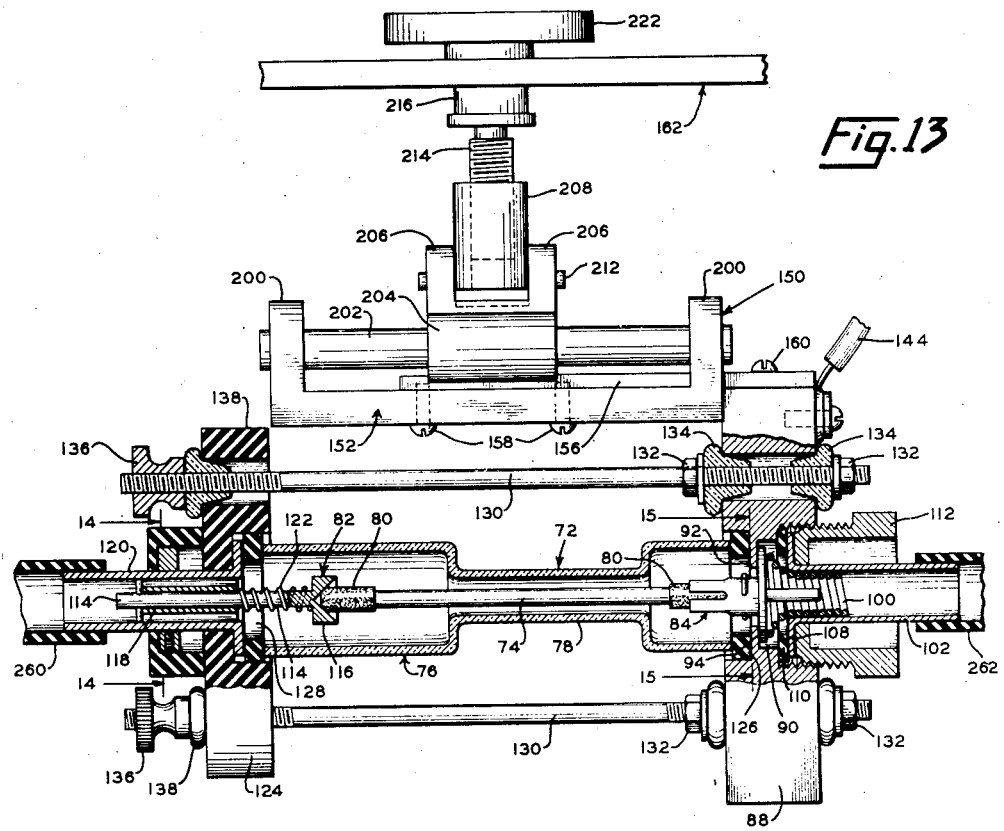
Fig. 13 is a sectional view on the line 13—13 of Fig. 12.
Figure 14:
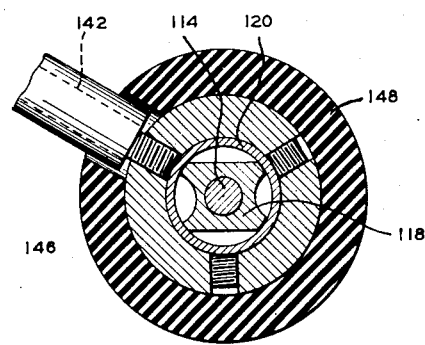
Figure 16:
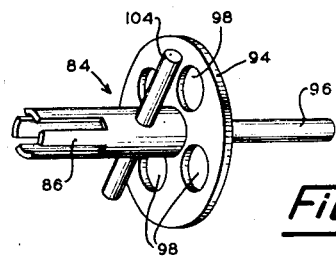
Figure 15:
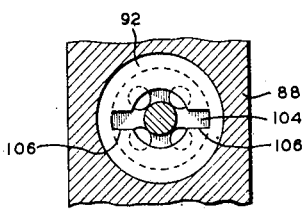
Figure 17:
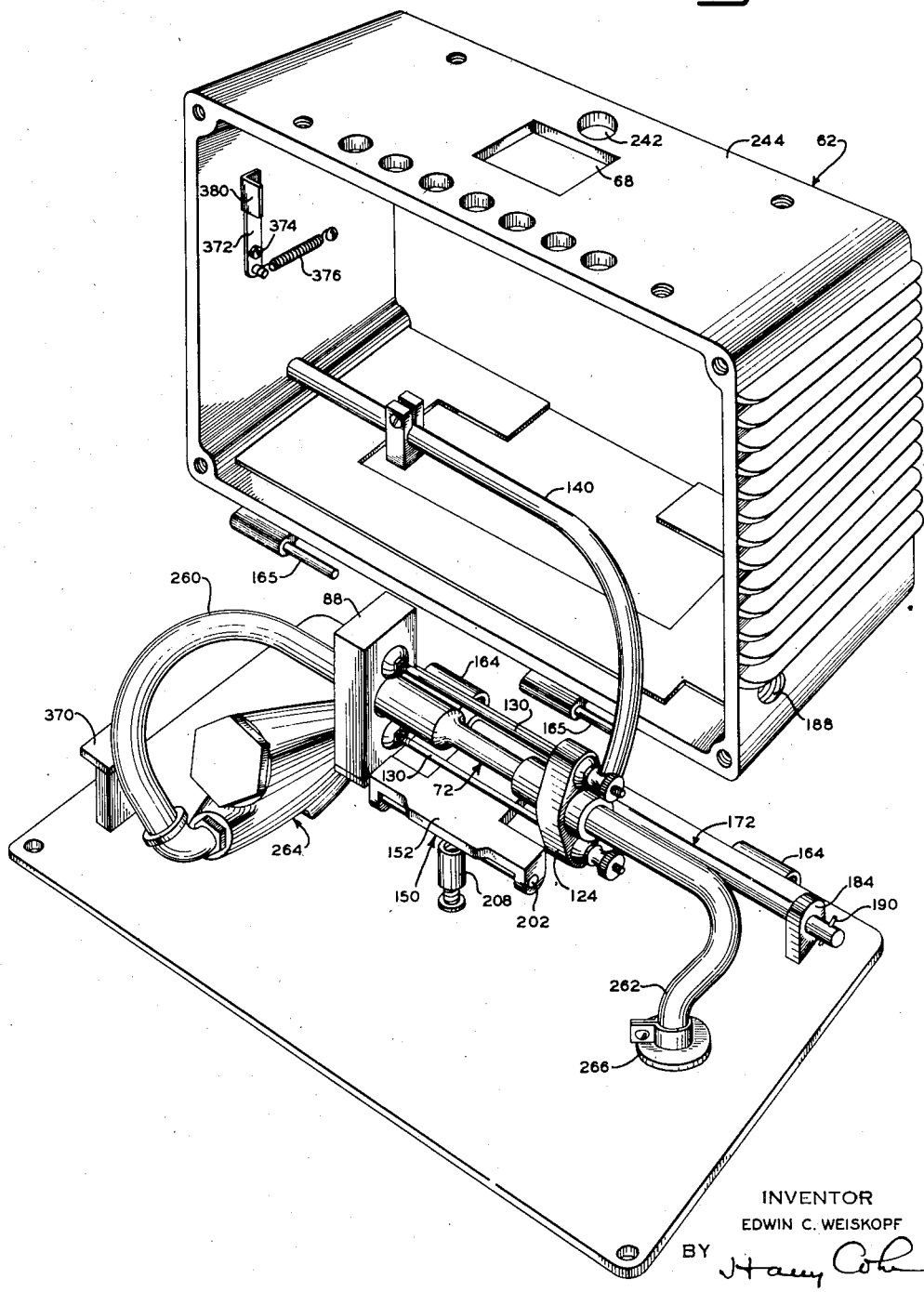

Figs. 14 and 15 are sectional views on the lines 14—14 and 15—15, respectively, of Fig. 13;

Fig. 16 is a perspective view of a terminal holder for one end of a tubular lamp of the light projector;

Fig. 17 is a perspective of the light housing, parts being omitted for the purpose of illustration, showing the hinged closure removed from the housing;

Fig. 18 is a perspective of the light housing, the closure being in an open position, showing a light source of another type and showing auxiliary devices associated with the light source;

Fig. 19A is a circuit diagram of light of Fig. 18;

Fig. 19 is a front view of the light housing when the latter is provided with the light source and auxiliaries shown in Fig. 18;

Fig. 20 is a sectional view on the line 20—20 of Fig. 2, the housing closure being in its closed position;

Fig. 21 is a view similar to Fig. 20, the housing closure being in its open position;

Fig. 22 is a view taken from the right of Fig. 20;

Fig. 23 is a view similar to Fig. 22 but showing the position of the parts when the housing closure is open;

Fig. 24 is a perspective view of the lens support shown in Fig. 11;

Fig. 25 is a perspective view of a connector plug.

Referring now to the drawings in detail, the apparatus to which the present invention relates comprises a viewing unit 10, a projector unit 12, and a power unit 14. The viewing unit 10 comprises a viewing chamber 16 which is preferably of the construction shown in my U. S. Patent No. 2,378,672, said chamber being mounted on a table 18. As here shown the top of table 18 of the viewing unit is provided with a recess 20 to receive therein a part of the top 22 of the stand or frame 24 of the projector unit 12. The table or stand 24 is provided with a hinged drop leaf extension 25 supported by horizontally swingable brackets 27 which may be swung under the top 22 when leaf extension 25 is down. As illustrated, the units 10, 12 and 14 are each provided with wheels or casters so that they are individually mobile and may be moved easily from place to place.

Figure 1:
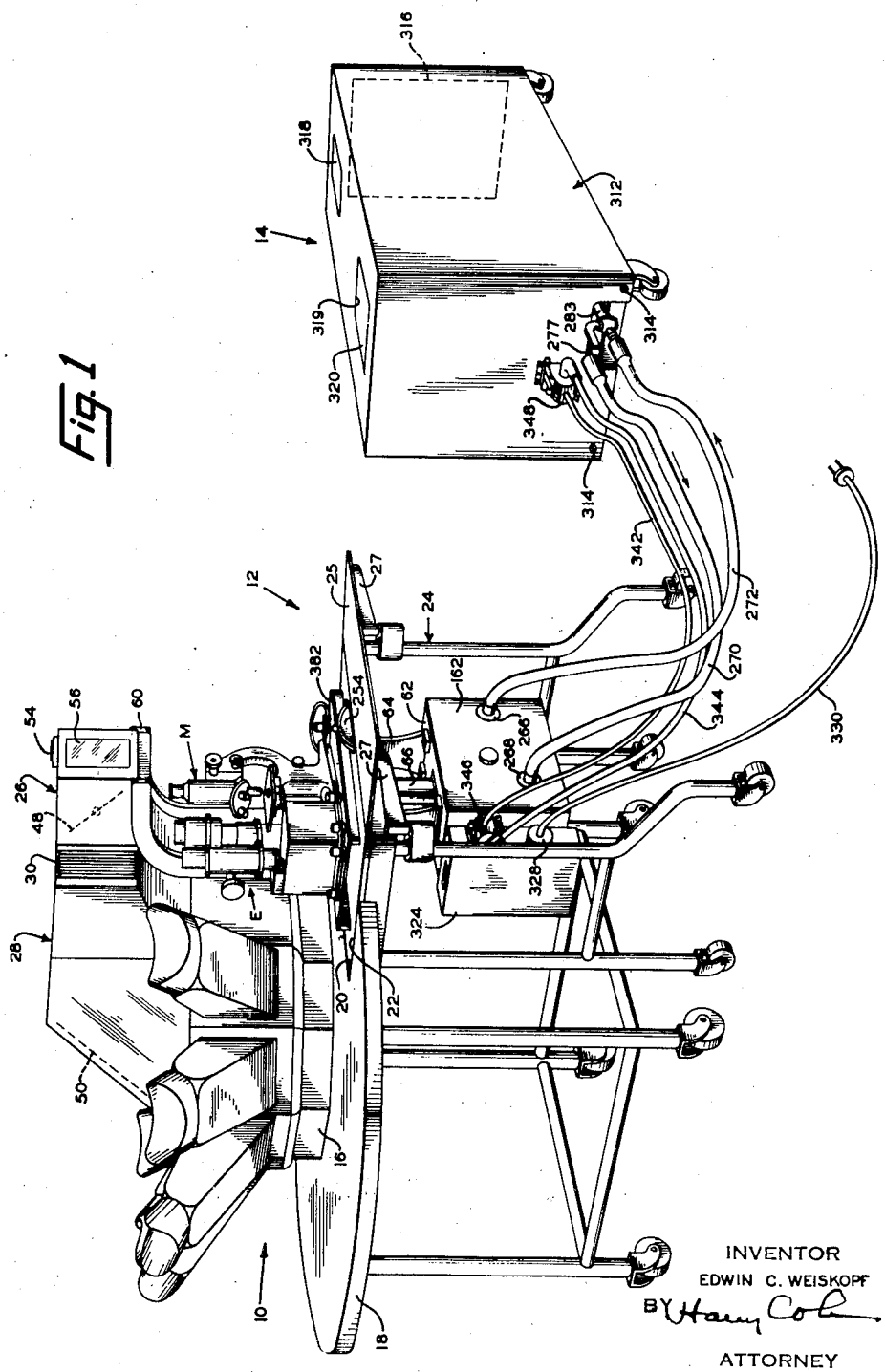
Fig. 1 is a perspective view of the apparatus, showing the viewing chamber unit, the projector unit, and the power unit.

In accordance with the present invention, the apparatus is constructed and arranged so that the projector unit 12 may be used either with or without the viewing unit 10. When used without the viewing unit 10, said projector unit 12 may be disconnected from said viewing unit. For this purpose provision is made for releasably connecting the light-reflector chamber 26 of the projector unit to the upper light tunnel 28 of the viewing unit. The releasable connecting means preferably comprises a flexible bellows 30 which is fastened at one end thereof to tunnel 28 and which is provided at its other end with a coupling part 32 adapted to be releasably fastened to chamber 26 in light-sealing relation therewith, as shown in Figs. 1 and 8. More specifically, as here shown, chamber 26 is provided with a light outlet opening 34 at which said chamber has vertical grooves 36 in which the coupling 32 is removably received. Said coupling member is provided with upper and lower lateral projections 38 and 40 and grooves 36 are provided with recesses 42 located near but above the lower ends of said grooves for the insertion of projections or lugs 40. When lugs 40 are at the level of recesses 42, lugs 38 of coupling member 32 are above the upper ends of grooves 36, so that by lowering coupling 32, the upper lugs 38 are disposed in said grooves and lugs 40 are positioned in said grooves below the recesses 42. In this position of the coupling member 32, the outer face thereof abuts the flat face of the rectangular frame 44 of opening 38 in light-sealing relation therewith.

The reflector chamber 26 is provided with a light inlet opening 45 which is preferably controlled by a shutter 46 as described in my application, Ser. No. 515,736. A plane mirror or other suitable light reflector 48 is positioned in chamber 26, instead of in the tunnel 38 of the viewing chamber, as in my above mentioned patent and application, for reflecting the image from the microscope M or other magnifier E, through opening 34, either to the reflector 50 of the viewing chamber, when the latter is connected to chamber 26, or to a screen in a projection room, when the viewing chamber is disconnected from chamber 26 of the projector unit 12. It will be understood that when the viewing chamber is not used, for example, in the case of operation of the projector unit 12 for room projection, the viewing chamber unit 10 may be entirely separated from the projector unit 12 and moved out of the path of light emanating from light-outlet opening 34.

Chamber 26 is also provided with a light-outlet opening 52 which is normally closed by a removable shutter plate 54. A ground glass or other focussing screen 56 is also removably mounted in chamber 26 at opening 52. Light reflector 48 is pivotally movable from a position in which it reflects the light or image toward opening 34, as shown in full lines in Fig. 8, to a position in which it reflects the light or image toward opening 52, as shown in dotted lines in said Fig. 8. A knob 58 is provided for moving said reflector to either of said positions, as described in my above mentioned applications. It will be noted that when the reflector is in the position shown in dotted lines in Fig. 8, and shutter 54 and screen 56 are removed, the light or image from the microscope or other magnifier may be transmitted through opening 52 for projection onto a screen in a projection room, without disconnecting the bellows 30 from chamber 26 or otherwise disconnecting the viewing chamber unit 10 from the projection unit 12.

The above described construction provides also a highly desirable way of taking photographs of the magnified image transmitted to chamber 26 from the microscope or other magnifier. A photographic plate, or a camera mounted on a supporting plate may be positioned at outlet opening 34, in grooves 36, bellows 38 being disconnected, or at opening 52 in the grooves for the screen 56, the latter being removed. Preferably the photographs are taken with the photographic plate or camera, as the case may be, mounted at opening 34, as under these conditions the focussing operation is facilitated. More specifically, when the photographic plate or camera is located at opening 34, the image to be photographed is first focussed on screen 56, reflector 48 being in its dotted line position (Fig. 8) and shutter 54 being removed. Then, after focussing the image on said screen, the reflector 48 is moved to its full-line position and shutter 54 is reinserted to close opening 52. It will be understood that openings 34 and 52 are at equal distances from the pivotal axis of reflector 48 so that when the image is focussed on screen 56 at opening 52, the photographic plate at opening 34 is automatically in focus, when reflector 48 is turned to its full-line position (Fig. 8). When the picture of the image is to be taken on a photographic plate, the latter protected by a removable light-obstructing plate, is mounted at opening 34, and the camera shutter 46 at the light inlet opening of chamber 26 is utilized for controlling the time of exposure of said photograph plate, as described in my above mentioned application Ser. No. 515,736. On the other hand, when the exposure is to be made by a camera which may be mounted at opening 34, the shutter 46 is adjusted so as to remain open and the time of exposure is controlled by the shutter of said camera, as described in my said application, Ser. No. 515,736. It will be understood of course that shutter 46 is adjusted to remain open during projection into the viewing chamber or onto a screen in the projection room.

Chamber 26 is supported by bracket arms 60 which are carried by stand 24 and project upwardly from the top 22 thereof. A light housing 62 is carried by stand 24 and as here shown is supported in position thereon below top 22 by brackets 64. Said top 22 is in the form of a flat plate. A light-outlet tube 66 is connected to the light-outlet opening 68 of projector housing 20 and extends through an opening in plate 22 to a point thereabove as shown in Fig. 2, the open upper end of said tube 66 being in registry with the inlet opening of chamber 26 through which the light passes to reflector 48. As will be subsequently described, provision is made for positioning either the microscope M or the magnifier E in registry with tube 66 over the open upper end thereof for projecting a magnified image of the slide to the reflector 48. The upper end of tube 66 is provided with a plurality of vertically spaced shelves 70 for supporting one or more color filters which may be used in projecting slides of certain tissue sections which are stained in certain colors.

An important feature of the present invention resides in the provision of means for producing an intense light whereby to obtain proper optical projection of the slide and, in conjunction with said intense light, the provision of means for adjusting the position of the source of light in the projector housing. In order to provide a source of light of high intensity, there is utilized in the light projector of the present invention a high voltage mercury vapor tubular lamp 72. Said lamp 72 is preferably of the type which comprises a quartz capillary tube 74 provided with spaced electrodes at its opposite ends, pools of mercury adjacent said electrodes, and a discharge gas, such as argon. Lamp 72 is water cooled and for that purpose there is provided a water jacket tube 76 of clear glass or other suitable transparent material. Water jacket tube 76 is provided with a constricted portion 78 which extends longitudinally of capillary tube 74 in the portion thereof from which the light is transmitted to the microscope or other magnifying device for illumination of the slide for forming the image. The purpose of providing water jacket tube 76 with said constricted portion 78 is to cause an increase of the velocity of the cooling water around said light emitting part of lamp tube 74, whereby to avoid the formation of air bubbles which would impair the proper light emission characteristics of the lamp. The opposite ends of lamp tube 74 are provided with conductor terminals 80 which are in mechanical and electrical engagement with the companion conducting members and supports 82 and 84, respectively. More particularly, member 84 is formed of metal and is provided with a split sleeve 86 in which one end of lamp tube 74 has a removable sliding fit. Said member 46 is mounted in a metal block 88 which has an opening or bore 90 therethrough. Block 88 has an integral annular ledge 92 which forms an abutment for the disk 94 which is fixed to the centering pin 96 integral with sleeve 86 of member 84, said disk 94 being provided with a plurality of openings 98 to allow the passage of water into the water jacket tube 76 at one end thereof. Disk 94 is held against abutment 92 by a spring 100 which is fixed at one end thereof in the tube 102 and which bears at its other end against said disk. Sleeve 86 is provided with a cross pin 104 which fits in recesses 106 provided in member 50 (Fig. 15) for preventing turning of member 84. The inner end of water tube 102 is provided with a flange 108 which is pressed against a rubber washer or packing 110 by a rotary sleeve or gland 112 to form a water tight joint, between tube 102 and member 88 in the bore 90 thereof. The lamp holding member 82 comprises a metal spindle 114 having a cupped end portion 116 in which the adjacent end of the lamp tube 74 is engaged and thereby supported. Spindle 114 is slidable in a metal guide 118 fixed in the metal tube 120. A spring 122 bears against one end of guide 118 and against the end 116 of holding member 82. Tube 120 is mounted in an opening 122 in a holder member 124 formed of insulation material. Rubber washers or packings 126 and 128 are mounted in members 88 and 124, respectively, for engaging the opposite ends of water jacket tube 76 to provide water tight joints between the opposite ends of said tube and said members 88 and 124.

Members 88 and 124 are removably supported on a pair of metal rods 130 which project through openings in said members as illustrated in Fig. 13. Each rod 130 is threaded at its opposite ends and is secured to member 88 by nuts 132 which engage companion insulation sleeves or bushings 134 slidably mounted in the adjacent end of rod 130. Member 124 is adjustable longitudinally of rods 130 and for this purpose the ends of said rods are engaged by nuts 136 which abut the companion insulation sleeves or bushings 138 which are slidably mounted on the ends of the companion rods. It will be understood that by tightening nuts 136 against the companion bushings 138 water jacket tube 76 is clamped at one end thereof against washer 126 and at its opposite end against washer 128. The construction thus described facilitates the assembly of the lamp unit and provide convenient means for replacing the lamp 72 when required. The terminal members 82 and 84 are connected to a source of high voltage by an insulated cable 140 having insulated wires 142 and 144 which are electrically connected to said terminals, respectively.

The lamp holder comprising members 88 and 124 and the above described parts associated therewith is adjustably supported in the housing by the adjustable supporting member or bracket 150 which includes a bar 152 having an integral lateral projecting portion 154 to which a plate 156 is fastened in any suitable way as by screws 158. Member 88 of the lamp holder is fastened to plate 156 in any suitable way as by screws 160. The support 150 for the lamp holder is carried by the front pivoted closure or door 162 of housing 62, said door being hinged at the bottom thereof to the housing by hinges 164 which removably engage the hinge pins 165 of the housing 62. Support 150 has a downwardly and forwardly inclined extension 166 (Fig. 11) which is connected to the lower part of the door in the manner hereinafter described, bar 152 being connected to the door at a point above the lower part of the latter by the mechanism hereinafter described, the construction and arrangement being such that said support 150 for the lamp holder is adjustable in a direction longitudinally of the lamp tube 72 and in a direction transversely of the axis of said lamp tube, all for the purposes which will hereinafter be explained. The lower end 168 of extension 166 is curved and internally threaded and is pivotally supported on a screw threaded part 170 of a rotary shaft 172 (Fig. 12).

Shaft 172 is mounted for rotation in bearings 174 formed on a bracket 176 secured to the inner surface of closure 162 near the bottom thereof. Shaft 172 is held against movement longitudinally thereof and for that purpose one end of said shaft is provided with a reduced end portion 178, which is journalled for rotation in the companion bearing 174, thus providing a shoulder 180 which engages said bearing and prevents longitudinal movement of the shaft in one direction. A collar 182 is secured on the reduced end portion 178 of shaft 172 in position adjacent the bearing 174 for preventing longitudinal movement of the shaft in the opposite direction. As illustrated in Fig. 12, shaft 172 is also supported for rotation in a bearing formed in a lug 184 which projects from the inner surface of closure 162. Shaft 172 extends to a point adjacent the inner surface of the side wall 186 of housing 62 in line with an opening 188 provided in said wall. Said shaft is provided with a cross pin 190 adapted to be engaged by the slotted end 192 of an operating key 194. As illustrated in Fig. 12, said key is provided with a threaded end portion 196 which is engaged in and closes opening 188 when said key is not used for rotating shaft 172. Said key is also provided with a knob or finger piece 198 to facilitate the turning of said key for rotating said shaft. It will be understood that when it is desired to rotate shaft 172 for moving extension 166 longitudinally of the threaded portion 170 of shaft 172, key 194 is disengaged from housing 62 and then the split end 192 is inserted through opening 188 of the housing for engaging said split end with cross pin 190 of the shaft.

Bar 152 of the lamp holder support or bracket 150 is provided with forwardly extending end portions 200 in which a guide member 202 constituted by a cylindrical rod is secured. A sleeve 204 is mounted for movement longitudinally of guide rod 202 and is provided with ears 206. An internally threaded sleeve 208 is pivotally connected to the ears 206 of sleeve 204 and for that purpose said sleeve 208 is provided with an extension 210 (Fig. 11) which fits between ears 206 and is pivotally connected to the latter by a pivot pin 212. Sleeve 208 is in screw threaded engagement with the screw threaded part of a spindle 214 which is mounted for rotation in a bearing bushing 216 which is positioned in an opening in closure 162. An operating knob comprising a metal sleeve 218 is secured to the outwardly projecting part 220 of spindle 214 and is provided with an insulation finger piece 222. A collar 224 on spindle 214 prevents longitudinal movement of said spindle in one direction, said collar being in engagement with the inner end of bearing bushing 216, and sleeve 218 of the operating knob engages the outer end of said bearing bushing to prevent longitudinal movement of said spindle in the opposite direction. Thus, by rotating spindle 214, sleeve 208 is moved transversely of the pivotal connection between said sleeve and sleeve 204 whereby support 150 is moved substantially in a horizontal plane in a direction which is transverse to the longitudinal axis of lamp tube 72, that is, in a direction transversely of the path of light from the lamp to the light outlet 68.

In accordance with the present invention and pursuant to another important feature thereof, provision is made for regulating the light which is transmitted from lamp 72 to the objectives of the microscope. In this connection, it will be understood that the conventional microscope with which the light projector of the present invention is primarily intended to be used includes a plurality of objective lenses of different magnifying powers carried by a rotary frame F (Fig. 2) which is operable to position each of said lenses in operative position alignment with the lens tube B and the eye-piece thereof, and it will be understood that said objective lenses of the microscope are of different diameters. By virtue of the feature of the invention which will now be described, a maximum quantity of light transmitted from lamp 72 is concentrated on the objective lenses of the microscope, and for this purpose provision is made for narrowing and widening the lens impinging part of the light beam in accordance with the diameters of the different objective lenses of the microscope, said part of the beam being narrowed for the objective lenses of the higher magnifying powers and correspondingly lower diameters, and widened for the objective lenses of the lower magnifying powers and correspondingly larger diameters. In order to accomplish this result a light condensing lens 226 (Fig. 11) is disposed in the path of light from lamp 72 to outlet 68 and is mounted for movement toward and away from said lamp longitudinally of the light path. As illustrated in Fig. 11, lens 226 is mounted in a holder 228.

Lens holder 228 is secured to a bracket 230 (Figs. 11 and 24) by means of a screw 232. Bracket 230 is carried by a rod 234, said bracket being fastened by means of a screw 235 to a clamping sleeve 236 which is adjustably secured to said rod. Said clamping sleeve 236 is provided with a clamping screw 237. Rod 234 is guided for longitudinal movement by vertically spaced guide members 238 carried by the rear wall 240 of the light housing. A screw 237A slidably engages rod 234 in a groove 239 to prevent said rod from turning about its longitudinal axis. Screws 232 and 235 provide for adjustment of lens holder 228 in two directions at right angles to each other for properly aligning the lens 226 carried by said holder with the light tube 66. Rod 234 projects through an opening 242 in the top wall 244 of housing 62, and the upper part of said rod is provided with a rack section 246 which is engaged by a pinion gear 248. The rotary shaft 250 to which gear 248 is secured is journalled for rotation in bearings provided in brackets 252 carried by the top 22 of the stand 24. Said shaft is rotated by a member 254 which is secured thereto and is rotatably positioned in a slot 256 provided in the top 22 of the projector stand. Operating member 254 is provided with an actuating knob 258. The provision in accordance with the present invention for regulating the light beam by movable lens 226, in accordance with the diameters of the different objective lenses of the microscope enables maximum illumination of the image to be achieved in a simple and convenient manner. Moreover, this feature of the invention eliminates the need for using sub-stage condensers of the microscope. In this connection it will be understood that microscopes of high quality are ordinarily provided with a set of sub-stage condensers which are used with the different objectives, respectively, of the microscope. These sub-stage condensers are not required and preferably are not used when the light projector of the present invention is employed. It will be noted lens 226 is movable axially through a distance of such length that said lens has a considerable range of adjustment to a plurality of positions along the length of the beam corresponding to the diameters or magnifying powers of the plurality of objective lenses respectively, of the microscope. In said different positions lens 226 is effective to control the width of the light beam in accordance with the diameters of said objective lenses, respectively, whereby to provide optimum transmission of light to the objective lenses.

It will be understood that the part of lamp 72 coextensive with the restricted portion 78 of tube 76 is positioned in centered relation to lens 226 for obtaining optimum transmission of light to said lens and through the latter to the objectives of the microscope or other magnifying devices. This positioning of the lamp is accomplished by adjustment of the lamp holder support 150 in a direction longitudinally of the lamp-tube axis, by operation of shaft 172, and in a direction transversely of said axis by operation of knob 222. It will be understood that for proper projection of the image the light beam from lamp 72 should be directed properly through light tube 66 along a line in registry with the optical axis of the microscope and that as much light as possible should be transmitted from said lamp to the microscope. The means for the adjustment of lens 226 and the means for adjustment of said lamp are therefore valuable features of the projector unit 12.

The water jacket 76 of the lamp 72 communicates with the tubes 102 and 120, as above described, and the latter are connected to flexible tubes 260 and 262. Tube 260 is connected to the outlet of a water filter 264 carried by closure 166 (Fig. 17). Tube 262 is connected to a nipple 266, mounted in closure 166 and the inlet of filter 264 is connected to a nipple 268 carried by said closure (Fig. 2). Said nipples 266 and 268 project through the closure for connection thereto of the flexible hose or pipes 270 and 272, respectively, and the latter are connected to the water supply in the power unit 14. The latter is provided with a rotary water pump 274 and an air cooled water-cooling radiator 276. Pump 274 is operated by an electric motor 278 and the radiator-cooling fan 280 is operated by an electric motor 282. The outlet of pump 274 is connected to flexible tube 270 by the pipe 277, the inlet of said pump being connected to the upper part of radiator 276 by pipe 279. The inlet at the lower end of the radiator is connected to flexible tube 272 by the pipe 283. Thus, the cooling liquid for the lamp 72 circulates in a closed system, in the direction indicated by the arrows in Fig. 1, and is kept at a sufficiently low temperature by said air cooled radiator 276 in the mobile power unit 14. The cap for the filling opening of the radiator is indicated at 285.

A step up transformer 284 (Fig. 9) is disposed in and constitutes part of mobile unit 14, the high voltage side of said transformer being connected to lamp 72. The preferred power of lamp 72 is 1200 watts, said lamp being energized at 1,000 volts and taking a current of about 1.4 amperes. A flow-controlled switch (not shown) is associated with the water-circulating system and preferably with the input side of the transformer 284 for controlling the electric circuit so that in the event of the failure of the circulation of cooling liquid through the jacket 76 of said lamp, the lamp is extinguished, preferably by interrupting the primary of said transformer. Said flow-controlled switch and various other auxiliary devices for controlling the electric circuit of the lamp are also disposed in unit 114.

Provision is made for eliminating or greatly reducing the vibration of the motor-pump unit 274, 278, of the motor-fan unit 280, 282, of transformer 284, and of all other parts which are of such character as to produce vibrations in the operation thereof. For this purpose all of said units and parts are supported by a frame 286 which is mounted on rubber or other resilient blocks 288 carried by and secured to the base frame 290 of tthe power unit 14. More specifically, as here shown, frame 286 is preferably formed of angle iron and comprises lower longitudinal members 292 connected at their adjacent ends by lower cross members 294, upper longitudinal members 296 connected at their ends by upper cross members 298, and the upright members 300, all of said frame members being rigidly fastened together by welding or in any other suitable way. As the lower frame members 292 are anchored to the resilient blocks 288 for supporting frame 286 and for securing it in position in the power unit 14, said frame 286 being otherwise free from direct support by or engagement with the base frame 290 of said unit, any vibration of frame 286 is largely absorbed by the resilient mounting blocks 288. Frame 286 is in turn protected against substantial vibration by the provision of rubber or other resilient mounting blocks 302 for the supporting frame 304 for the pump-motor unit 274, 278 and for the motor-fan unit 280, 282. As here shown, said frame 304 has a bottom 306 and sides 308, the latter being provided at their upper ends with lateral portions 310 which are anchored to the resilient mounting blocks 302 which in turn are fastened to the upper longitudinal members 296 of frame 286. Thus, frame 304 is suspended from frame 286 by said resilient mounting blocks 302 so that vibration of the units carried by frame 304 is largely, if not entirely, absorbed by blocks 302 and thus prevented from being communicated to frame 286. The frame of the pump motor 278 and the frame of the fan motor 282 are individually and separately secured to the bottom 306 of frame 304 at opposite sides, respectively, of said frame bottom 306, as illustrated in Figs. 9 and 10.

Power unit 14 is provided with a housing cover 312 which is removably secured to base frame 288 in any suitable way as by bolts or screws 314. Said housing is provided with an opening 316 for the inflow of air to cool the radiator 276. An opening 317 is provided in said housing for the ends of pipes 277 and 283. The top of said housing is provided with an opening 318 for access to the radiator filling opening 285 and with an opening 319, normally closed by a removable plate 320, for access to switches mounted on the top of frame 286 as hereinafter referred to. Said housing is open at its bottom so that it can be easily removed for access to the devices of the power unit. The interior of said housing 312 of unit 14 is lined with sound-absorptive material so as to reduce to a minimum the noise of the air flow induced by fan 280 as well as the noise of the fan and of the motors in said unit. The reduction or substantial elimination of noise is a desirable feature of the present invention for obvious reasons and more especially because the operation of the micro-projector may be accompanied by a lecture in respect to the subject matter of the micro-slides exhibited in the operation of the projector. This reduction or substantial elimination of noise is effected to a considerable degree by the provision for causing the radiator-cooling air to flow into the housing of unit 14 instead of expelling the air from the housing past the radiator for cooling the latter, especially since the noise of the air flowing into the housing past the radiator is largely absorbed by the sound absorptive material of housing 312.

The electrical distribution means included in the apparatus of the present invention for operating the projector lamp 72, the electric motors and other electrically operated devices in the power unit, and other lamps and devices which are hereinafter referred to comprises a distribution and control box 324 which is preferably provided as a part of the projector unit 12 (Figs. 1, 2, 18 and 19). Said distribution box 324 is conveniently supported by lamp housing 62 by means of supporting rods 326. Current is supplied to distribution box 324 by the detachable terminal plug 328 of the supply line 330 which may be connected to any convenient source of alternating current of ordinary low voltage, say 110 volts. A terminal connector block 332 (Figs. 18 and 19) is mounted in a chamber 334 provided in box 324. Said terminal block is provided with a set of low voltage terminals 336 and a set of high voltage terminals 338. Box 324 is also provided with a plurality of low voltage outlet receptacles 340. All of said low voltage terminals or outlet receptacles 336 and 340 are connected in parallel to the input receptacle to which the low voltage plug 328 is connected. A low voltage distribution line in the form of a flexible insulated cord 342 is connected to the low voltage terminals 336 of distribution box 324 and to corresponding low voltage terminals of a terminal block mounted in power unit 14 for supplying current to the primary of transformer 284 and to the motors and other electrically operated devices mounted in said power unit. A high voltage distribution line in the form of a flexible heavily insulated cable 344 is connected to the high voltage terminals 338 of distribution box 324 and to the corresponding high voltage terminals of the terminal block which is mounted in the power unit for transmitting current at high voltage from the secondary of transformer 284 to the terminals of light projector lamp 72 to which the wires 140 and 142 of flexible cable 144 are connected as hereinbefore described.

The opposite ends of cord 342 and cable 344 are provided with quick detachable plugs 346 and 348 engageable, respectively, with terminal block 332 of the distribution box 324 and with the above mentioned similar terminal in the power unit 14. Said plugs 346 and 348 are of the same construction and as shown in Fig. 25, with reference to plug 346, each of said plugs comprises an insulation block 350 having a flat face 352 provided with prong low voltage terminals 354, which engage the low voltage socket terminals 336 of block 332, and high voltage socket terminals 356 which are engaged by the high voltage prong terminals 338 of said block 332. It will be understood that cord 342 is connected at its opposite ends to prong terminals 354 of plug 346 and to the similar socket terminals of plug 348, and similarly that cable 344 is connected at its opposite ends to socket terminals 356 of plug 346 and to the similar socket terminals of plug 348. Plug 346 is releasably secured to distribution box 324 by suitable releasable fastening means, here shown as a pair of clasp members 358 pivotally mounted on said box in positions above and below chamber 334 (Figs. 18 and 19) for releasable holding engagement with catch members 360 (Figs. 2 and 25) provided on plug 356. Similar fastening means is provided on power unit 14 for plug 348.

It will be noted that power unit 14 is mechanically separate from the projector unit except for the flexible water tubes 270 and 272 and the flexible electric conductor cord 342 and cable 344, so that the devices in the power unit are maintained out of vibrating relation to the projector unit 12. By mounting the transformer 284, the motor operated water pump and the motor operated fan for the radiator out of vibrating relation to the stand 24 of the projector unit 12, the vibrations of said transformer and of the other electrical or movable devices in unit 14 are prevented from being transmitted to the microscope M or to the enlarger E on said stand. Accordingly the micoslides or other transparencies or objects the images of which are projected into the viewing chamber or onto a screen in the projection room, as the case may be, are protected against vibration so that such images are steady and distinct for observation, free from the undesirable effects which might otherwise result from the effects of vibrations.

In view of the high voltage in the lamp housing 62 of the projector unit 12, safety means are provided to eliminate the danger of personal injury which would be present in case access to the interior of said housing could be obtained when high voltage is connected to the terminals of the lamp holder. For this purpose, provision is made for preventing opening of closure 162 when plug 346 is connected to the distribution box 324 and for preventing the connection of said plug to said distribution box unless the closure 162 is in its closed position. Referring in this connection to Figs. 11, 18, and 20 to 23, it will be observed that a rod 362 is slidably mounted in aligned openings 364 and 366 of lamp housing 62 and chamber 334, respectively. Said rod 362 is provided with an operating member 363 which also constitutes stop means engageable with housing 62 and box 324 to limit the movement of said rod in either direction. An interlock member 368 is rigidly secured to closure 162 at the inner side thereof and is provided with a lateral extension 370 which overlaps the companion interlock member or rod 362 longitudinally of the latter (Fig. 20) when said rod is in one position thereof and closure 162 is closed whereby the latter cannot be opened when said rod projects into housing 62. On the other hand, unless rod 362 is in the position in which it projects into housing 62 and is disposed in the path of extension 370 of interlock member 368 so as to prevent opening of closure 162, plug 346 cannot be inserted into the receptacle chamber 334 of the distribution box 324 for connection with the terminals 336 and 338 of terminal block 332. Thus, as shown in Fig. 21, when the closure 162 is open, rod 362 projects into receptacle chamber 332 and thereby prevents insertion of plug 346 into said chamber and thereby prevents the connection of the terminals of said plug with the terminals in said chamber. In order to prevent plug 346 from being inserted in chamber 334 and connected to the terminals therein unless the closure 162 is closed provision is made for preventing retraction of rod 362 from said chamber, and for this a barrier member 372 is arranged to close opening 364 when closure 162 is open, as shown in Figs. 21 and 23. Barrier member 372 is secured to the housing side wall which is provided with opening 364 for rod 362 and is mounted for pivotal movement in any suitable way as by a pivot screw 374 for movement from a projected position in which member 372 covers said opening (Figs. 21 and 23) to a retracted position in which said opening is uncovered (Figs. 20 and 22). A tension spring 376 is connected at one end thereof to member 372 and at its opposite end to the wall of housing 62 for moving member 372 to its projected position, under the control of closure 162. A stop pin 378 is mounted on the wall of housing 62 to engage and position barrier member 372 in said projected position of the latter. Said barrier member is provided with a laterally projecting abutment 380 which is engaged by interlock member 362 for moving barrier 372 to its retracted position when the closure 162 is closed. Thus member 372 is movable into and out of the path of interlock member 362 under the control of closure 162 so that plug 346 cannot be inadvertently inserted in receptacle chamber 332 for energizing the terminals of lamp 72 unless said closure is in its closed position so that access to the interior of the housing is thereby prevented.

It will be observed that the power unit 14 is automatically de-energized electrically when plug 346 is disconnected from distribution box 324, since the supply of electricity to the electrical instrumentalities of said unit is transmitted thereto only by line 342 which is automatically electrically disconnected from the source of current by disconnecting plug 346. Moreover, there are no live terminals on plug 346 when the latter is disconnected and there are no live terminals on plug 348 when plug 346 is disconnected, and furthermore if plug 348 is disconnected while plug 346 is connected the only live terminals of plug 348 are the low voltage terminals thereof. The provision on the same plug 346 of both the low and the high voltage terminals eliminates the danger of exposure to high voltage at the receptacle chamber 334 when said plug is removed therefrom.

As indicated above, the projector unit 12 includes means for mounting and positioning either a microscope M or another optical magnifier or enlarger E selectively in registry with the upper end of light tube 66. The means provided for this purpose comprises a carrier 382 (Figs. 1 to 5) which is slidably mounted on the top 22 of the projector stand 24 and which carries the microscope M and the magnifier E. Said carrier 382 comprises a plate 383 provided with depending brackets 384 each provided with a roller 386 which rides on a companion guide rail or rod 388 carried by the top 22. Said rails 388 are disposed in laterally spaced relation and as clearly shown in Fig. 4 one of said rails is spaced longitudinally of the other two rails to conform to the similar arrangement of the companion rollers 386, respectively, of carrier 382. Said rails are secured in companion pairs of longitudinally spaced supporting members 390 which are fastened to the top or stationary supporting plate 22 in any suitable way, as by screws 392. Adjustable stop rods 394 and 396 are provided on carrier 382 in position to engage the adjacent bracket arms 60, respectively, when the microscope M or the magnifier E is in registry with light tube 66, as the case may be. As shown in Fig. 4, stop rod 394 enages one of the arms 60 when the carrier is positioned so that the optical system of microscope is in registry with light tube 66, as shown in Fig. 2, and it will be understood that stop rod 396 engages the other bracket arm 60 when the magnifier E is positioned in registry with said light tube. Adjustable clamps 398 for rods 394 and 396 are secured to plate 383 of carrier 382. Said plate 383 is provided with an opening 400 (Fig. 4) to permit movement of carrier 382 transversely of light tube 66. Said carrier is provided with a handle 402 as a convenient means for moving said carrier longitudinally of plate 22.

The carrier plate 383 is provided with adjustable means for releasably holding the microscope in position on said plate. As here shown (Fig. 4), said adjustable means comprises a block 404 and blocks 406 engageable with the ends of the forked base of the microscope. Said blocks are slidable on plate 383 and are provided with longitudinal slots 408 in which the stems of companion adjustable clamping and guide screws 410 are disposed, said screws being threaded into plate 383. Additional releasable clamping means 412 are provided, as shown in Fig. 3, for releasably engaging the forked ends of the microscope base at the upper surfaces thereof to hold the microscope firmly on carrier plate 383.

The enlarging device E comprises magnifiers M1 and M2 mounted on a post 414 carried by a frame 416 fastened to the top of slidable carrier plate 383. The top 418 of said frame is provided with a light opening 420 which registers with the light tube 66 when the enlarging device E is in its operative position. It will be understood that each of the magnifying devices M1 and M2 includes a set of lenses for obtaining the desired magnifications of the slides of these magnifiers, respectively. Magnifiers M1 and M2 are turnable about the axis of post 414 for registering said magnifier selectively with opening 420. Magnifying devices M1 and M2 are adjustable vertically toward and away from light opening 420 in any suitable way as by a conventional pinion and rack device operable by a rotary knob 422. Frame 416 is releasably secured on the top of carrier plate 383 in any suitable way as by screws 424 which pass through the base flange 426 of said frame and are threaded into openings in said plate 383. A lens 428 may be mounted in the grooves at the upper part of light tube 66, instead of the filter which may be used, as indicated above, when the microscope is used, said lens serving to provide a wider beam of light for the magnifiers M1 or M2 when the latter are used, since the lens of magnifiers M1 and M2 are of larger diameter than the microscope lenses. It will be understood that when the microscope is used lens 226 in the housing 62 is adjusted to condense and concentrate a maximum amount of light on the objective lens of the microscope throughout the area of said objective lens. On the other hand, when the magnifier E is used, the lenses of the magnifying devices M1 or M2, being larger than the microscope lenses, require for best performance a wider beam of light than the comparatively narrow beam directed onto the microscope objective lens. The provision of this wider light beam is accomplished, as stated above, by the use of an auxiliary lens such as the lens 428.

The provision in the apparatus of the present invention for positioning either the microscope M and one or more other magnifiers, such as the magnifiers M1 and M2, is highly desirable as it enables differently magnified images to be projected selectively by the light projector of the present invention, for example, a slide or photographic transparency of a cancerous growth can be projected through the magnifiers M1 or M2 followed by the projection through the microscope M of a microslide carrying a microscopic section of said cancerous growth, thus enabling observation and examination of the microscopic section of various areas thereof in comparison with an enlargement of the cancerous growth from which said microscopic section was obtained. Further it will be understood that by adjusting the frame F for varying the magnifying power of the microscope, various areas of the microscopic section carried by the microslide in the microscope can be selectively magnified as may be required for the examination of said section.

When it is desired to take colored photographs of the slide or other transparency or other object magnified by the microscope M or by the enlarger E, as the case may be, an incandescent lamp is utilized in the housing of the light projector, instead of the lamp 72. Accordingly, provision is made for substituting a complete lamp-mounting and adjusting unit carrying the incandescent lamp as a part of the unit in place of the mounting and adjusting unit which carries the tubular lamp 72. This lamp mounting and adjusting unit is illustrated in Figs. 18 and 19 where it is indicated by the reference numeral 430. Said unit comprises a hinged closure or panel 162A provided with hinge members 164A for engagement with the hinge pins 165 of the lamp housing 62 when the hinged closure or panel 162, provided as the mounting means for the tubular lamp 72, is removed. In other words, it will be understood that when the incandescent lamp is to be used closure 162, together with all of the parts carried thereby, is removed from the housing 62 and the hinged closure 162A of the unit 430 is connected to said lamp housing. The incandescent lamp 432 of unit 430 is mounted on a bracket 434 which is fixed to and carried by the slidable holder 150A which corresponds to the bracket or holder 150 of the other unit. Bracket 434 which carries lamp 432 is moved forwardly and rearwardly by a mechanism which is the same as the mechanism provided in the other unit for moving the tubular lamp 72 forwardly and rearwardly, and said bracket 434 is movable longitudinally of the lamp housing by a mechanism which is similar to the mechanism provided in the unit for moving tubular lamp 72 longitudinally of its axis. The first mentioned mechanism by which the lamp carried by the bracket 434 is moved forwardly and rearwardly comprises the parts shown in Figs. 11 and 13 and are designated by the same numerals, respectively, with the letter A added. The mechanism for moving the bracket 434 and the lamp carried thereby longitudinally of the lamp housing comprises the rotary shaft 172A which is operable in the same way as the shaft 172, said shaft having a screw-threaded portion 170A which is in threaded engagement with a member 436 fixed to bracket 434, so that by rotating said shaft 172A said bracket is movable longitudinally of said shaft. Thus, lamp 432 is mounted for movement substantially in a horizontal plane in two directions at right angles to each other for registering said lamp with the light outlet 68 of the lamp housing.

Unit 430 also carries a step-down transformer 438, an adjustable rheostat 440 provided with a rotary adjusting knob 442, a volt meter 444, and a switch 446. Said unit is also provided with an opening 448 for the electric supply cord 450 which has a terminal plug 452 which is detachably engageable with the terminals of one of the outlet receptacles 340 of distribution box 324. It will be observed that lamp 432 operates at a low voltage, the normal voltage rating of said lamp being about 6 volts and the normal power rating being 60 watts. Transformer 438 is operable to reduce the normal 110 voltage of the outlet receptacle 340 to a voltage which is a few volts higher than the normal voltage rating of lamp 432. The rheostat 440 which is in series with the transformer primary (Fig. 19A) is effective to control the voltage at which the lamp is operated. More particularly, in operating the light projector with the lamp 432, rheostat 440 is adjusted so that at the applied voltage the lamp takes more than the normal current rating of the lamp so that said lamp burns more brilliantly than would be the case if operated at its normal voltage and current rating. The meter 444 is utilized for indicating the voltage at which the lamp operates pursuant to the adjustment of rheostat 440. It has been found in actual practice that good results are obtained in taking the photograph when the lamp is operated at nine volts which as indicated above is an over excited or over energized condition of the lamp which results in the brilliance of the illumination provided by said lamp. Since over-excitation of the lamp need be provided only momentarily at the time of exposure in taking the photograph, the life of the lamp is not seriously shortened.

Provision is made in accordance with the present invention for cooling the microscope lenses and the micro-slide while the latter is positioned on the stage S of the microscope. In this connection, it will be understood that the intense light which emanates from the high voltage lamp 72 which is the lamp utilized in the lamp housing of the projector unit for producing magnified images of the micro-slide by means of the microscope M is accompanied by intense heat which may impair the micro-slide and the objective lenses of the microscope through which said beam of light is projected. These undesirable results are eliminated by the cooling means embodied in the projector unit 12. As here shown (Figs. 2 and 3), said cooling means comprises a motor operated fan 454 which is mounted in a frame 456 carried by stand 24 adjacent bracket arms 60. It will be noted that fan 454 is positioned in relation to light tube 66 so that when carrier 382 is moved to position the microscope M, with the optical axis of the microscope in registry with said light tube, as shown in Fig. 2, a stream of cooling air is directed by fan 454 for cooling the micro-slide which is positioned on the stage S of the microscope for counteracting the heating effect of the light beam on said slide and on the microscope lenses. Similarly it will be noted that when the magnifier E is in operative position, as illustrated in Fig. 3, fan 454 is effective to direct the stream of cooling air on the slide or other transparency which may be positioned on the top 418 of frame 416 for projection through the magnifier M—1 or M—2, as the case may be. The electric motor which operates fan 454 may be connected by a suitable cord (not shown) to one of the outlet receptacles 340.

When the high voltage lamp 72 is used, which is usually the case, unit 430 being removed and the lamp mounting unit or closure 162 being mounted on the housing 62, the power unit 14 is likewise used. It is convenient to provide manually operated control switches on the frame 286 of said power unit for starting and stopping the operation of the motors 278 and 282 and for connecting and disconnecting the primary of the transformer 284 to and from the source of electricity. For this purpose a switch panel 450 is mounted on the top of frame 286 (Fig. 9), said panel being provided with said switches which are accessible through opening 319 of housing 312 when closure plate 320 is removed.

It will be understood that the invention may be embodied otherwise than as herein specifically illustrated or described and that in the illustrated embodiment and certain changes in the details of construction and in the arrangement of parts may be made without departing from the underlying idea or principles of the invention within the scope of the appended claims.

Having thus described my invention, what I claim and desire to obtain by Letters Patent, is:

1. In micro-projection apparatus, a light projector unit and a viewing chamber unit mounted on their own relatively movable supports which are independent of each other; said projector unit comprising a light housing, a support for a microscope, and light receiving and reflecting means disposed above said support so that light which is transmitted from said housing through the optical system of the microscope, when the latter is positioned on said support, is received by said light-reflecting means for reflection by the latter; and means for releasably connecting said viewing chamber to said projector unit in light-receiving relation to said reflecting means for transmission by the latter of micro-images into said viewing chamber, said independent supports and said releasable connection enabling separation of said units so that said projector unit may be used for the projection of micro-images onto a screen independently of said viewing chamber.

2. In micro-projection apparatus for use with a microscope, a light-projector unit which includes a horizontal support for a microscope, a light housing having a light outlet for the passage of light from said housing through the optical system of the microscope, and a light-receiving chamber in said unit disposed above said horizontal support in light receiving relation to said light outlet in position in said unit so that the light which passes from said housing and through the microscope is received in said chamber, said chamber having a light-outlet; a viewing chamber having a horizontal light-receiving surface therein, a light passage having means for directing light to said surface, and provided with a plurality of viewing openings for observation of said surface from points externally of the chamber; and means for removably connecting said light passage of the viewing chamber to said light outlet of said light-receiving chamber of said projector unit for the transmission of light from the latter and through said light passage to said surface of the viewing chamber.

3. A micro-projector unit for use with a microscope, said unit comprising a stand providing a support for the microscope for mounting the latter in position to receive light from a light projector, and means carried by said stand in position to receive the light which passes through the optical system of the microscope, when the latter is positioned on the stand, and to project the light onto a screen, said last mentioned means comprising a chamber having a light inlet, two light outlets in spaced parallel planes at right angles to the plane of said light inlet, and a reflector movably mounted in said chamber between said light outlets in the path of light which enters said chamber through said light inlet, said reflector being movable to two different positions to reflect the light to said two light outlets, respectively.

4. A micro-projector unit for use with a microscope, said unit comprising a stand providing a support for the microscope for mounting the latter in position to receive light from a light projector, and means carried by said stand in position to receive the light which passes through the optical system of the microscope, when the latter is positioned on the stand, and to project the light onto a screen, said last mentioned means comprising a chamber having a light inlet, two light outlets in spaced parallel planes at right angles to the plane of said light inlet, and a reflector movably mounted in said chamber between said light outlets in the path of light which enters said chamber through said light inlet, said reflector being movable to two different positions to reflect the light to said two light outlets, respectively, means on said chamber for mounting a translucent screen at one of said light outlets, and means on said chamber for mounting a photographic plate at the other of said outlets.

5. A micro-projector unit for use with a microscope, said unit comprising a stand providing a support for the microscope for mounting the latter in position to receive light from a light projector, and means carried by said stand in position to receive the light which passes through the optical system of the microscope, when the latter is positioned on the stand, and to project the light onto a screen, said last mentioned means comprising a chamber having a light inlet, two light outlets in spaced parallel planes at right angles to the plane of said light inlet, and a reflector movably mounted in said chamber between said light outlets in the path of light which enters said chamber through said light inlet, said reflector being movable to two different positions to reflect the light to said two light outlets, respectively, means on said chamber for mounting a translucent screen at one of said light outlets, and means on said chamber for mounting a photographic plate at the other of said outlets, and a camera shutter carried by said chamber at said light inlet for controlling the exposure of the photographic plate.

6. In micro-projection apparatus, a projector unit comprising a light housing for an electric lamp operable at a high voltage, and electrical distribution means comprising a panel box having a set of low voltage terminals and a set of high voltage terminals therein, said high voltage terminals being connected to said lamp, means for connecting said low voltage terminals to the primary of a step-up transformer, means removably engageable with said high voltage terminals for connecting the latter to the secondary of the transformer, said two last mentioned connecting means comprising a unitary connecting member carrying low and high voltage terminals removably engageable with said low and high voltage terminals, respectively, of said distribution means whereby said transformer is automatically de-energized when said terminals of the unitary connecting member are removed from said terminals of the panel box.

7. In micro-projection apparatus comprising a projector unit having a light housing provided with electric light therein; a power unit separate from but associated with said projector, said power unit including a step-up transformer for supplying current at an elevated voltage to said light; electric distribution means carried by said projector, said distribution means including a set of low voltage terminals adapted to be connected to a source of low voltage and a set of high voltage terminals connected to the terminals of said light; electrical connecting means between said low voltage terminals and the primary of said transformer, and electrical connecting means between the secondary of said transformer and said high voltage terminals, said two last mentioned connecting means comprising a unitary connecting member carrying low and high voltage terminals removably engageable with said low and high voltage terminals, respectively, of said distribution means whereby said transformer is automatically de-energized when said terminals of the unitary connecting member are removed from said terminals of the panel box.

8. In micro-projection apparatus, a projector unit comprising a light housing for an electric lamp operable at a high voltage, and electrical distribution means comprising a panel box having a set of low voltage terminals and a set of high voltage terminals therein, said high voltage terminals being connected to said lamp, means for connecting said low voltage terminals to the primary of a step-up transformer, means removably engageable with said high voltage terminals for connecting the latter to the secondary of the transformer, said two last mentioned connecting means comprising a unitary connecting member carrying low and high voltage terminals removably engageable with said low and high voltage terminals, respectively, of said distribution means whereby said transformer is automatically de-energized when said terminals of the unitary connecting member are removed from said terminals of the panel box, a closure for said housing movable from a closed position to an open position, and means for preventing movement of said closure to said open position when said high voltage terminals are connected to the transformer and for preventing the connection of said high voltage terminals to the transformer by said removable means when said closure is in said open position thereof.

9. In micro-projection apparatus comprising a projector unit having a light housing provided with electric light therein; a power unit separate from but associated with said projector, said power unit including a step-up transformer for supplying current at an elevated voltage to said light; electric distribution means carried by said projector, said distribution means including a set of low voltage terminals adapted to be connected to a source of low voltage and a set of high voltage terminals connected to the terminals of said light; electrical connecting means between said low voltage terminals and the primary of said transformer, and electrical connecting means between the secondary of said transformer and said high voltage terminals, a closure for said housing movable from a closed position to an open position, and means for preventing movement of said closure to said open position when said high voltage terminals are connected to the transformer and for preventing the connection of said high voltage terminals to the transformer by said removable member when said closure is in said open position thereof.

10. In a light projector for a microscope, said projector comprising a lamp housing for an electric lamp for the light projector, and a closure for said housing movable from a closed position, in which the closure bars access to the interior of said housing, to an open position for permitting access to the interior of the housing; releasable means for connecting said lamp electrically to a source of electric current, means for preventing movement of said closure to said open position thereof unless said connecting means is disconnected from said source, and means for preventing the connection of said lamp to said source unless said closure is in its closed position, said closure movement preventing means comprising an interlock member carried by said closure at the inner side thereof, and a movable interlock member in holding relation to said first mentioned interlock member in said housing when said connecting means is operative to connect said lamp to said source, said movable interlock member being operable in one position thereof to prevent connection of said lamp to said source when said closure is in said open position thereof, and movable means carried by said housing and releasably operable under the control of said closure for preventing movement of said movable interlock member from said connection-preventing position when said closure is open.

11. In micro-projection apparatus, a projector unit comprising a light housing for an electric lamp operable at a high voltage, and electrical distribution means comprising a panel box having a set of low voltage terminals and a set of high voltage terminals therein, said high voltage terminals being connected to said lamp, means for connecting said low voltage terminals to the primary of a step-up transformer, means removably engageable with said high voltage terminals for connecting the latter to the secondary of the transformer, a closure for said housing movable from a closed position, in which the closure bars access to the interior of said housing, to an open position for permitting access to the interior of the housing, and means including a member movable in said panel box and in said housing for preventing movement of said closure to said open position thereof when said terminals of the panel box are connected to the transformer by said connecting means and for preventing connection of said terminals to said transformer by said connecting means when said closure is in said open position thereof.

12. In micro-projection apparatus, a light projector unit and a viewing chamber unit mounted on their own relatively movable supports which are independent of each other; said projector unit comprising a light housing, a support for a microscope, and light receiving and reflecting means disposed above said support so that light which is transmitted from said housing through the optical system of the microscope, when the latter is positioned on said support, is received by said light reflecting means for reflection by the latter; and means including a flexible bellows for releasably connecting said viewing chamber to said projector unit in light-receiving relation to said reflecting means for transmission by the latter of micro-images into said viewing chamber, said independent supports and said releasable connection enabling separation of said units so that said projector unit may be used for the projection of micro-images onto a screen independently of said viewing chamber.

13. In micro-projection apparatus for use with a microscope, a light-projector unit which includes a horizontal support for a microscope, a light housing having a light outlet for the passage of light from said housing through the optical system of the microscope, and a light-receiving chamber in said unit disposed above said horizontal support in light receiving relation to said light outlet in position in said unit so that the light which passes from said housing and through the microscope is received in said chamber, said chamber having a light-outlet; a viewing chamber having a horizontal light-receiving surface therein, a light passage having means for directing light to said surface, and provided with a plurality of viewing openings for observation of said surface from points externally of the chamber; and means including a flexible bellows for removably connecting said light passage of the viewing chamber to said light outlet of said light-receiving chamber of said projector unit for the transmission of light from the latter and through said light passage to said surface of the viewing chamber.

EDWIN C. WEISKOPF.

REFERENCES CITED

The following references are of record in the file of this patent:

UNITED STATES PATENTS

| Number | Name | Date |
|---|---|---|
| 1,433,877 | Exton | Oct. 31, 1922 |
| 1,548,675 | Gayhart | Aug. 4, 1925 |
| 1,852,804 | Cocksedge | Apr. 5, 1932 |
| 1,900,109 | Hendry | Mar. 7, 1933 |
| 2,064,368 | Bausch et al. | Dec. 15, 1936 |
| 2,133,321 | Ehrlich | Oct. 18, 1938 |
| 2,137,103 | Yost et al. | Nov. 15, 1938 |
| 2,160,648 | De Jong et al. | May 30, 1939 |
| 2,195,425 | Roger | Apr. 2, 1940 |
| 2,248,210 | Worthington et al. | July 8, 1941 |
| 2,269,794 | Stechbart | Jan. 13, 1942 |
| 2,313,639 | Hauser | Mar. 9, 1943 |
| 2,378,672 | Weiskopf | June 19, 1945 |
| 2,435,300 | Weiskopf | Feb. 3, 1948 |

FOREIGN PATENTS

| Number | Country | Date |
|---|---|---|
| 147,911 | Austria | Nov. 25, 1936 |